April 7, 1931.  W. E. EDGCUMBE-RENDLE  1,800,009
ROAD AND RAIL VEHICLE
Filed June 2, 1930  3 Sheets-Sheet 1
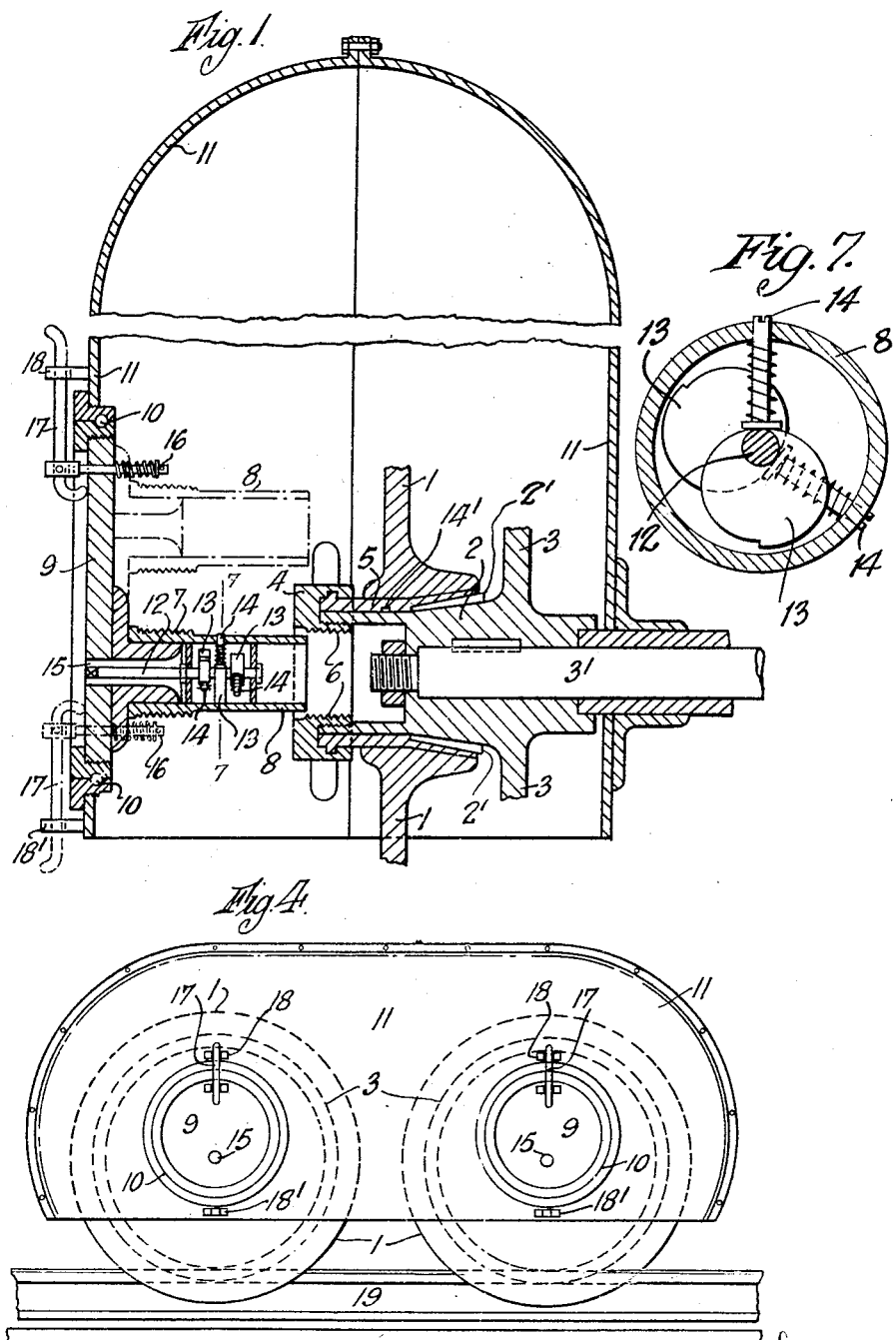

April 7, 1931. W. E. EDGCUMBE-RENDLE 1,800,009
ROAD AND RAIL VEHICLE
Filed June 2, 1930 3 Sheets-Sheet 2
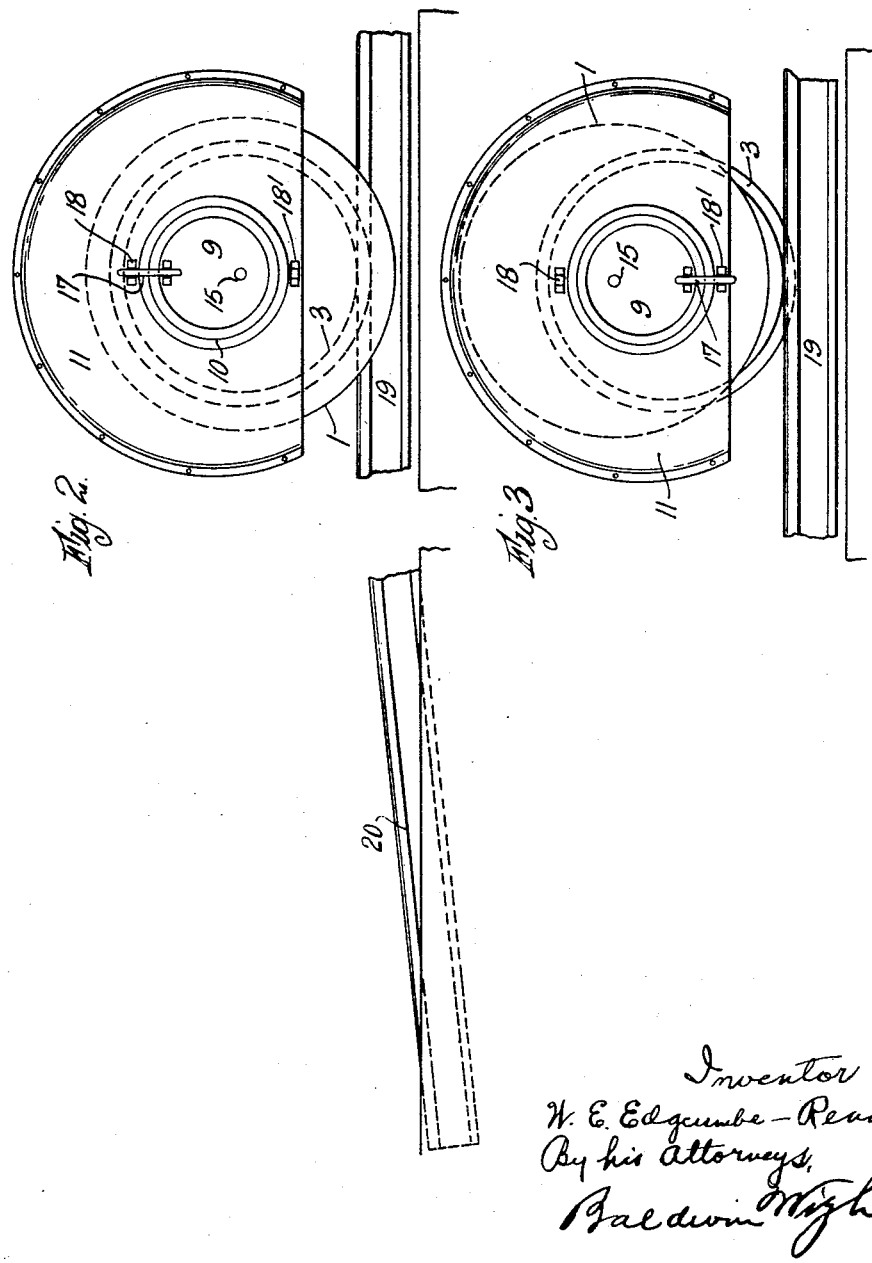

April 7, 1931. W. E. EDGCUMBE-RENDLE 1,800,009
ROAD AND RAIL VEHICLE
Filed June 2, 1930   3 Sheets-Sheet 3
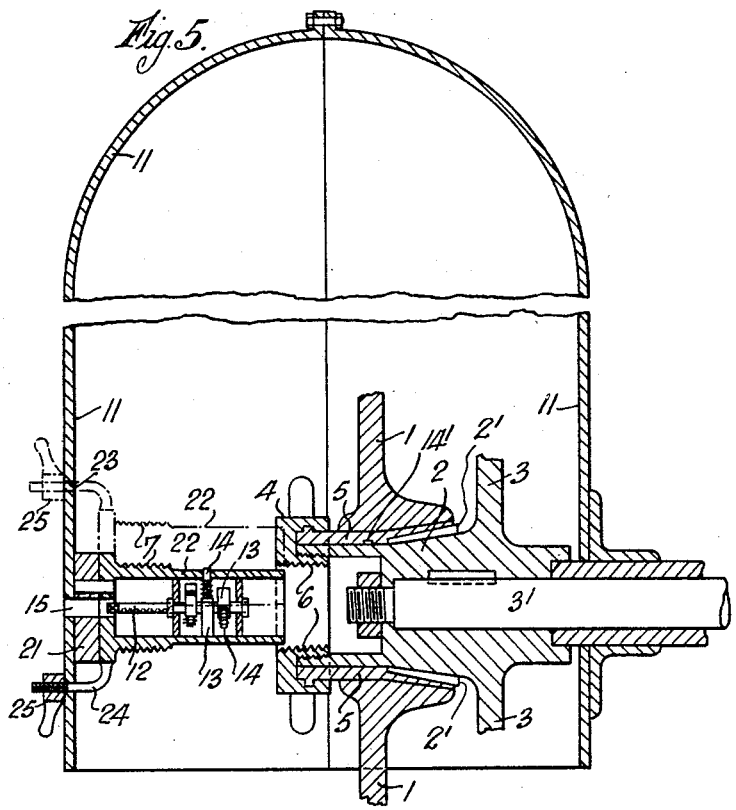
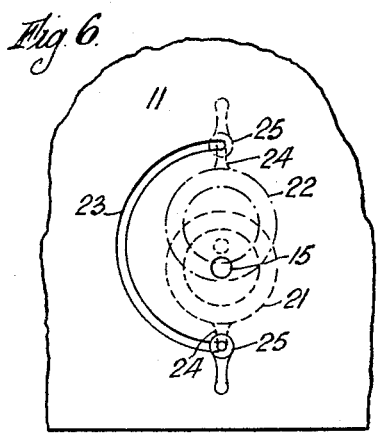

Patented Apr. 7, 1931

1,800,009

UNITED STATES PATENT OFFICE

WILLIAM EDGCUMBE EDGCUMBE-RENDLE, OF LONDON, ENGLAND

ROAD AND RAIL VEHICLE

Application filed June 2, 1930, Serial No. 458,950, and in Great Britain April 7, 1930.

This invention relates to road and rail vehicles.

A road and rail vehicle constructed in accordance with the present invention is provided with a carrier which can be moved into and out of a position coaxial with respect to the axle of the vehicle, the carrier when in the coaxial position being adapted to receive a road wheel which can be placed in driving connection with a flanged wheel and when out of coaxial position supports the road wheel in its inoperative position.

The carrier preferably comprises an axle secured eccentrically to a member such as a disc rotatably mounted in a support which may conveniently comprise a casing.

The invention is illustrated in the accompanying drawings in which Fig. 1 is a vertical section through the wheel carrier and casing, Fig. 2 shows in side elevation the device upon a rail track and prior to the change over from the road to the rail wheel and Fig. 3 shows also in side elevation the position of the parts of the device after the change over from the road to rail wheel. Figure 4 shows the device as applied to the rear pair of wheels on a six-wheel vehicle whilst Figures 5 and 6 show a modification. Figure 7 is a cross sectional view taken on the line 7—7 of Figure 1.

Referring to Figure 1, 1 is a detachable road wheel of the loose ring type which when the said vehicle is to be run upon the road or like surface is mounted in the position shown in Figure 1 upon the hub 2 of a flanged wheel 3, itself mounted upon the axle $3^1$ of the vehicle, the hub being provided with keys $2^1$ for transmitting drive from the axle $3^1$ to the road wheel 1. 4 is a loose ring which is secured to the road wheel hub 5 and is internally threaded at 6 to engage with a threaded portion 7 of a hollow fixed axle 8, which is eccentrically secured to a disc 9 mounted on bearings 10 so as to rotate in a casing 11. Journalled within the axle 8 is a shaft 12 upon which are mounted cams 13 each of which carries a spring controlled arm 14 which upon rotation of the shaft 12 is adapted to project through the fixed axle and engage in a recess $14^1$ in the hub 5 of the road wheel 1 so as securely to hold it and lock it upon the threaded portion 7 of the fixed axle 8. The disc 9 is provided with a hole 15 to receive a key to actuate the said shaft 12.

Preferably the fixed axle 8 is of such a length that it extends slightly within the loose ring 4 which rotates around it and the thread provided on the portion 7 of the fixed axle is of such dimensions as to leave a smooth surface at the free end thereof. It will be seen that the fixed axle plays the same part as the usual hub-cap.

To the disc 9 is secured by a spring controlled pin 16 passing therethrough a lever 17 which is normally urged by the spring into engagement with a catch 18 fast on the casing 11. Two such catches 18 are provided diametrically opposite one another, one catch $18^1$ for preventing rotation of the disc 9 when the road wheel 1 is carried upon the fixed axle 8 and the other catch 18 for aligning the fixed axle parallel with the flanged wheel hub 2 when the road wheel 1 is in the operative position.

The casing 11 is U-shaped in cross section and is mounted, in the case of the front wheels, on the stub axle and, in the case of the back wheels, upon the back axle casing and is adapted to enclose both the road wheel 1 and the flanged wheel 3, thus taking the place of the usual vehicle mud-guard.

Referring now to Figure 2 the device is shown with the flanged wheel 3 running upon a rail 19. 20 is a ramp up which the vehicle is run when it is desired to engage with the rail track or conversely down which it is run when it is desired to run off the rail track and on to the road surface. The parts are shown in their positions just prior to the raising of the road wheel fast with the fixed axle to the position shown in Figure 3. In this figure the road wheel 1 has been raised to such a height that it is clear of any normal obstruction, the vehicle running over the rail track upon the flanged wheel 3.

It will be obvious that the road wheel is of larger diameter than the flanged wheel so that, when running on the road, the flanged wheel cannot contact with the road surface. When it is desired to run the vehicle upon the rail track, the road wheel is detached from the flanged wheel hub and carried upon the fixed axle.

This operation is effected in the following manner: The vehicle is run up the ramp 20 on to the rail track 19 with the flanged wheels 3 resting thereon, the road wheels 1 being clear of the ground on either side of the track; hence "jacking up" of the vehicle is dispensed with. The loose ring 4 is then rotated so as to disengage with the threaded portion of the flanged wheel hub 2 which rotation withdraws the road wheel from off the flanged wheel hub. The road wheel 1 is then slidden across the smooth portion at the free end of the fixed axle 8, which in view of its proximity to the hub of the flanged wheel acts as a guide for movement of the road wheel 1, until the internal thread 6 on the loose ring engages with the threaded portion 7 of the fixed axle, the loose ring being then screwed to the end of the threaded portion 7 of the fixed axle. In order to lock the road wheel 1 in position on the fixed axle 8, the shaft 12 therein is rotated by a key inserted through the hole 15 in the casing 11. The cams 13 on the said shaft 12 then move the arms 14 against the action of their springs into engagement with the hub of the road wheel 1, which is thereby locked against rotation on said axle.

In order to raise the road wheel 1 so as to be clear of any obstruction, the lever 17 is pulled out of engagement with the catch 18 against the action of the spring on the pin 16 and the disc 9 is then rotated by the lever 17 through 180°. The fixed axle 8 being eccentrically secured to the said disc 9 is thereby raised to the position shown in Figure 3, or in dot and peck lines in Figure 1 the lever 17 then being released and due to the action of the spring it is forced into engagement with the catch 18¹, whereby any further movement of the disc 9 and axle 8 fast therewith is prevented.

To lower the road wheel 1, the reverse operation is effected and to unlock the said wheel from the threaded portion 7 of the fixed axle 8, the shaft 12 is rotated thereby allowing the arms 14 in contact with the cams 13 to return to their normal position under the action of their springs. Then the loose ring 4 is rotated until the wheel 1 is secured in position on the hub 2 of the flanged wheel 3.

As shown in Figure 4 the casing 11 is extended so as to enclose two sets of road wheels and flanged wheels such as are used on six wheel road and rail vehicles.

In the modification shown in Figures 5 and 6 the fixed axle comprises two portions 21 and 22, the threaded portion 22 being so mounted upon the other portion as to allow of an eccentric movement therebetween. The portion 21 of the axle is fast with the casing 11 which is provided with a semi-circular slot 23, concentric with the axis of the eccentric mounting of the fixed axle and adapted to receive an arm 24 fast with the threaded portion 22 of the fixed axle. The end of the arm 24 projecting through said slot is provided with a lock nut 25 to lock it in any desired position.

With this modified form the operation of securing the road wheel 1 upon the fixed axle is identical with that described with reference to Figure 1. In order to raise the road wheel from this position, the lock nut 25 is slackened. This frees the threaded portion 22 of the fixed axle so that it can be rotated about the fixed portion 21. Since the road wheel 1 is held fast with the threaded portion 22, it is now capable of movement in a vertical plane. It is then rotated and in view of the eccentric mounting of the fixed axle the road wheel is thereby raised, the arm 24 fast with the fixed axle moving in the semi-circular slot 23. When the road wheel 1 has been moved through 180°, the lock nut 25 is tightened and the road wheel thereby locked in the raised position. The reverse operation is effected to lower the wheel and secure it upon the hub 2 of the flanged wheel 3.

What I claim is:

1. In a road and rail vehicle, a carrier which can be moved into and out of a position coaxial with respect to the axle of said vehicle, said carrier, when in the coaxial position, being adapted to receive a road wheel which can be displaced from driving connection with a flanged wheel, and when out of coaxial position, supports said road wheel in its inoperative position.

2. In a road and rail vehicle, the combination of a flanged wheel, a road wheel, and a carrier mounted to be moved into and out of a position coaxial with respect to the axle of said vehicle, said carrier, when in the coaxial position, being adapted to receive said road wheel which can be displaced from driving connection with said flanged wheel, and when out of coaxial position supports said road wheel in its inoperative position.

3. In a road and rail vehicle, the combination of a flanged wheel, a road wheel, a carrier mounted to be moved into and out of a position coaxial with respect to the axle of said vehicle, said carrier, when in the coaxial position, being adapted to receive said road wheel which can be displaced from driving connection with said flanged wheel, and when out of coaxial position, supports said road wheel in its inoperative position, and means for securing said road wheel on said carrier and on the hub of said flanged wheel.

4. In a road and rail vehicle, the combination of a flanged wheel, a road wheel, a carrier mounted to be moved into and out of a position coaxial with respect to the axle of said vehicle, said carrier, when in the coaxial position, being adapted to receive said road wheel which can be displaced from driving connection with said flanged wheel, and when out of coaxial position supports said road wheel in its inoperative position, and means for locking said road wheel against rotation when in its inoperative position on said carrier.

5. In a road and rail vehicle, the combination of a flanged wheel, a road wheel, a carrier mounted to be moved into and out of a position coaxial with respect to the axle of said vehicle, said carrier, when in the coaxial position, being adapted to receive said road wheel which can be displaced from driving connection with said flanged wheel, and when out of coaxial position supports said road wheel in its inoperative position, means for securing said road wheel on said carrier and on the hub of said flanged wheel, and means for locking said road wheel against rotation when in its inoperative position on said carrier.

6. In a road and rail vehicle, the combination of a flanged wheel, a road wheel, a hollow carrier mounted to be moved into and out of a position coaxial with respect to the axle of said vehicle, said hollow carrier, when in the coaxial position, being adapted to receive said road wheel which can be displaced from driving connection with said flanged wheel and when out of coaxial position supports said road wheel in its inoperative position, a shaft mounted in said hollow carrier, cams mounted on said shaft, and spring controlled arms on said cams, adapted by rotation of said shaft to project through said hollow carrier, to engage the road wheel to prevent it from rotation when in its inoperative position on said hollow carrier.

7. In a road and rail vehicle, the combination of a flanged wheel, a road wheel, a hollow carrier mounted to be moved into and out of a position coaxial with respect to the axle of said vehicle, said hollow carrier, when in the coaxial position, being adapted to receive said road wheel which can be displaced from driving connection with said flanged wheel and when out of coaxial position supports said road wheel in its inoperative position, means for securing said road wheel on said hollow carrier, and on the hub of said flanged wheel, a shaft mounted in said hollow carrier, cams mounted on said shaft, and spring controlled arms on said cams, adapted by rotation of said shaft to project through said hollow carrier, to engage the road wheel to prevent it from rotation when in its inoperative position on said hollow carrier.

8. In a road and rail vehicle, the combination of a fixed support, a disc rotatably mounted thereon, a carrier eccentrically secured to said disc and which can be moved by rotation of said disc into and out of a position coaxial with respect to the axle of said vehicle, a flanged wheel, a road wheel which can be slidden from the hub of said flanged wheel on to said carrier when in the coaxial position, and means for securing said road wheel on said carrier and on the hub of said flanged wheel.

9. In a road and rail vehicle, the combination of a fixed support, a disc rotatably mounted thereon, a carrier eccentrically secured to said disc and which can be moved by rotation of said disc into and out of a position coaxial with respect to the axle of said vehicle, a flanged wheel, a road wheel which can be slidden from the hub of said flanged wheel on to said carrier when in the coaxial position, and means for locking said road wheel against rotation when in its inoperative position on said carrier.

10. In a road and rail vehicle, the combination of a fixed support, a disc rotatably mounted thereon, a carrier eccentrically secured to said disc and which can be moved by rotation of said disc into and out of a position coaxial with respect to the axle of said vehicle, a flanged wheel, a road wheel which can be slidden from the hub of said flanged wheel on to said carrier when in the coaxial position, means for securing said road wheel on said carrier and on the hub of said flanged wheel, and means for locking said road wheel against rotation when in its inoperative position on said carrier.

11. In a road and rail vehicle, the combination of a fixed support, a disc rotatably mounted thereon, a hollow carrier eccentrically secured to said disc and which can be moved by rotation of said disc into and out of a position coaxial with respect to the axle of said vehicle, a flanged wheel, a road wheel which can be slidden from the hub of said flanged wheel on to said hollow carrier when in the coaxial position, a shaft mounted in said hollow carrier, cams mounted on said shaft and spring controlled arms on said cams and adapted by rotation of said shaft to project through said hollow carrier to engage the road wheel to prevent it from rotation when in its inoperative position on said hollow carrier.

12. In a road and rail vehicle, the combination of a fixed support, a disc rotatably mounted thereon, a hollow carrier eccentrically secured to said disc and which can be moved by rotation of said disc into and out of a position coaxial with respect to the axle of said vehicle, a flanged wheel, a road wheel which can be slidden from the hub of said flanged wheel on to said hollow carrier when in the coaxial position, means for securing said road wheel on said hollow carrier and on the hub of said flanged wheel, a shaft mounted in said hollow carrier, cams mounted on said shaft and spring controlled arms on said cams and adapted by rotation of said shaft to project through said hollow carrier to engage the road wheel to prevent it from rotation when in its inoperative position on said hollow carrier.

13. In a road and rail vehicle, the combination of a fixed support, a disc rotatably mounted thereon, a carrier eccentrically secured to said disc and which can be moved by rotation of said disc into and out of a position coaxial with respect to the axle of said vehicle, a flanged wheel, a road wheel which can be slidden from the hub of said flanged wheel on to said carrier when in the coaxial position, means for securing said road wheel on said carrier and on the hub of said flanged wheel, and means for preventing rotation of said disc when the road wheel is in its operative or inoperative position.

14. In a road and rail vehicle, the combination of a fixed support, a disc rotatably mounted thereon, a carrier eccentrically secured to said disc and which can be moved by rotation of said disc into and out of a position coaxial with respect to the axle of said vehicle, a flanged wheel, a road wheel which can be slidden from the hub of said flanged wheel on to said carrier when in the coaxial position, means for locking said road wheel against rotation when in its inoperative position on said carrier, and means for preventing rotation of said disc when the road wheel is in its operative or inoperative position.

15. In a road and rail vehicle, the combination of a fixed support, a disc rotatably mounted thereon, a hollow carrier eccentrically secured to said disc and which can be moved by rotation of said disc into and out of a position coaxial with respect to the axle of said vehicle, a flanged wheel, a road wheel which can be slidden from the hub of said flanged wheel on to said hollow carrier when in the coaxial position, means for securing said road wheel on said hollow carrier and on the hub of said flanged wheel, a shaft mounted in said hollow carrier, cams mounted on said shaft and spring controlled arms on said cams adapted by rotation of said shaft to project through said hollow carrier to engage the road wheel to prevent it from rotation when in its inoperative position on said hollow carrier, a member secured to said disc, two catch members carried by said fixed support, one of said catch members being adapted to be engaged by said member when the road wheel is in its operative position, the other catch member being adapted to be engaged by said member when the road wheel is in its inoperative position to prevent rotation of said disc.

16. In a road and rail vehicle, the combination of a fixed support, a disc rotatably mounted thereon, a hollow carrier eccentrically secured to said disc and which can be moved by rotation of said disc into and out of a position coaxial with respect to the axle of said vehicle, a flanged wheel, a road wheel which can be slidden from the hub of said flanged wheel on to said hollow carrier when in the coaxial position, means for securing said road wheel on said hollow carrier and on the hub of said flanged wheel, a shaft mounted in said hollow carrier, cams mounted on said shaft, spring controlled arms on said cams adapted by rotation of said shaft to project through said hollow carrier to engage the road wheel to prevent it from rotation when in its inoperative position on said hollow carrier, a member secured to said disc, two catch members carried by said fixed support, one of said catch members being adapted to be engaged by said member when the road wheel is in its operative position, the other catch member being adapted to be engaged by said member when the road wheel is in its inoperative position so prevent rotation of said disc.

In testimony that I claim the foregoing as my invention I have signed my name this 23rd day of May, 1930.

WILLIAM EDGCUMBE EDGCUMBE-RENDLE.